May 24, 1932.  A. J. OTTO  1,859,407
TEMPERATURE REGULATION
Filed March 22, 1928   2 Sheets-Sheet 1
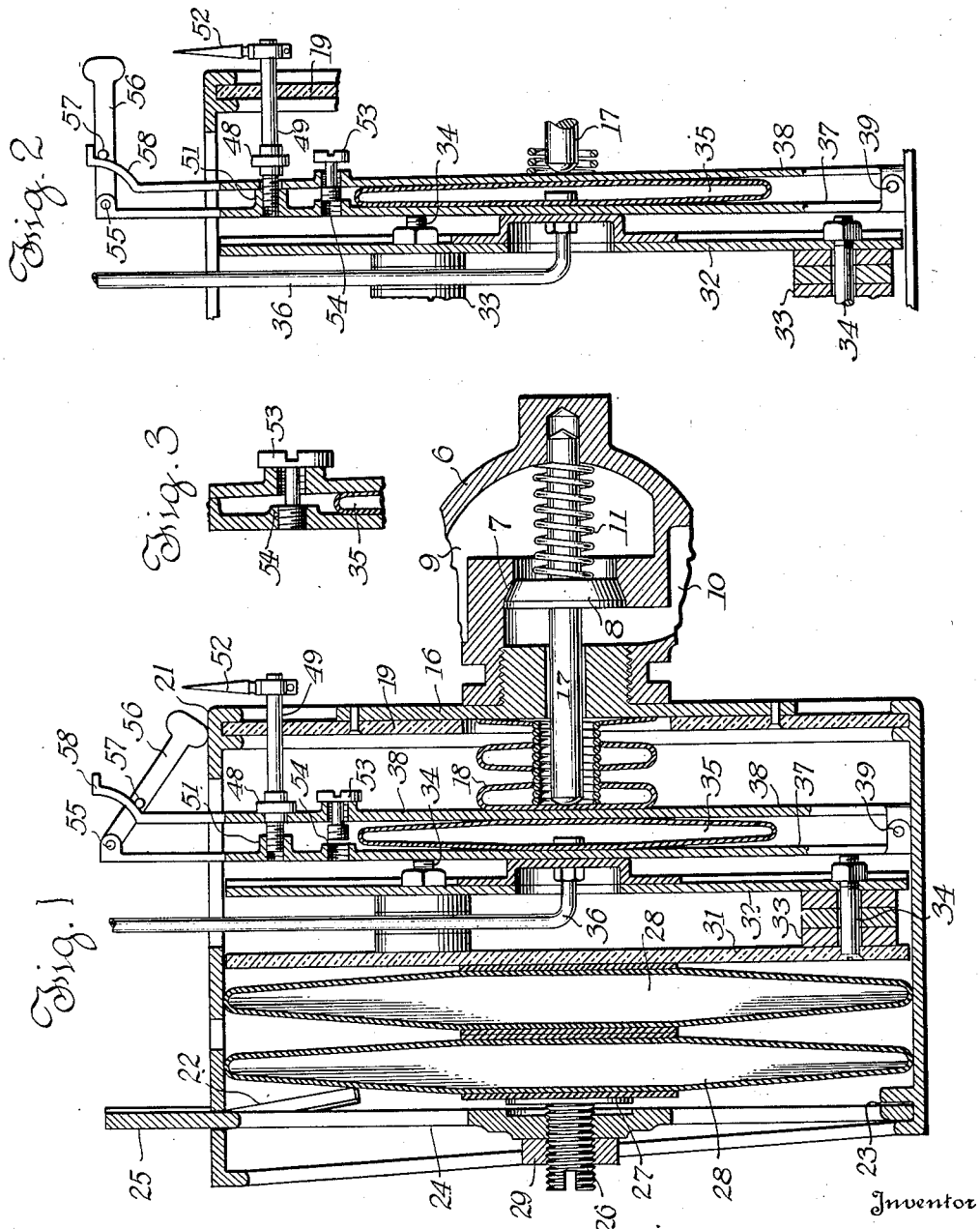

Patented May 24, 1932

1,859,407

UNITED STATES PATENT OFFICE

ARTHUR J. OTTO, OF MILWAUKEE, WISCONSIN, ASSIGNOR TO JOHNSON SERVICE COMPANY, OF MILWAUKEE, WISCONSIN, A CORPORATION OF WISCONSIN

TEMPERATURE REGULATION

Application filed March 22, 1928. Serial No. 263,754.

This invention relates to temperature regulation and particularly to thermostatic systems designed to maintain one temperature during the day and another during the night.

Prior to the present invention systems of the pneumatic leak port type have been devised having what is known as selective group control. In these systems it is possible to maintain a normal temperature throughout the building in the daylight hours and a lower temperature during the night, the change from one setting to another being made through a central station by the engineer or janitor. Such systems have been, generally speaking, of two types, one in which the temperature was positively regulated at one point during the day and at another during the night, and another in which the temperature was regulated during the day and was not regulated during the night, the heat being merely shut off.

Systems of the first named type, so far as known to me, involve the use of two thermostatic elements and some means for selecting between them so that one or the other becomes effective. Systems of the second class involve only one thermostatic element which maintains the desired day temperature and which is rendered inoperative at night. Such systems also involve some means for locking the instrument so that it will maintain day temperature at all times and certain other systems involve in addition to the features just mentioned, but incidental thereto, a device local to each thermostat which will temporarily establish day conditions at that thermostat while the system as a whole remains set or biased for night operation.

The purpose of the present invention is to extend the selective group control idea to what may be described as direct connected thermostats, i. e., those in which the thermostatic element operates directly on the heat controller. there being no intervening relay mechanism and no occasion for pressure fluid supply lines or the equivalent to affect the regulating function.

Another purpose of the invention is to accomplish with a thermostat of this general class, regulation at one temperature during the day and at a different temperature during the night without requiring the use of two thermally responsive elements, and in such a way as to permit the remote control not only to establish a normal day temperature and a lower temperature at night, but to determine at a point remote from the thermostat approximately what the night temperature depression below the normal day temperature shall be. The inventive concept is applicable to a wide range of direct connected thermostats, but for purposes of explanation I have shown it applied to the thermostat disclosed in the patent to Roys 1,522,981, issued January 13, 1925.

In the accompanying drawings,—

Fig. 1 is a vertical axial section of the thermostat and heat controller of the Roys patent showing my invention applied thereto.

Fig. 2 is a fragmentary view similar to a portion of Fig. 1 showing the device conditioned temporarily to maintain day temperature while the system as a whole is set to maintain night temperature.

Fig. 3 is a fragmentary view on a slightly enlarged scale, illustrating how the selecting device may be locked permanently in inactive position so that day temperature is maintained at all times.

Figure 4:
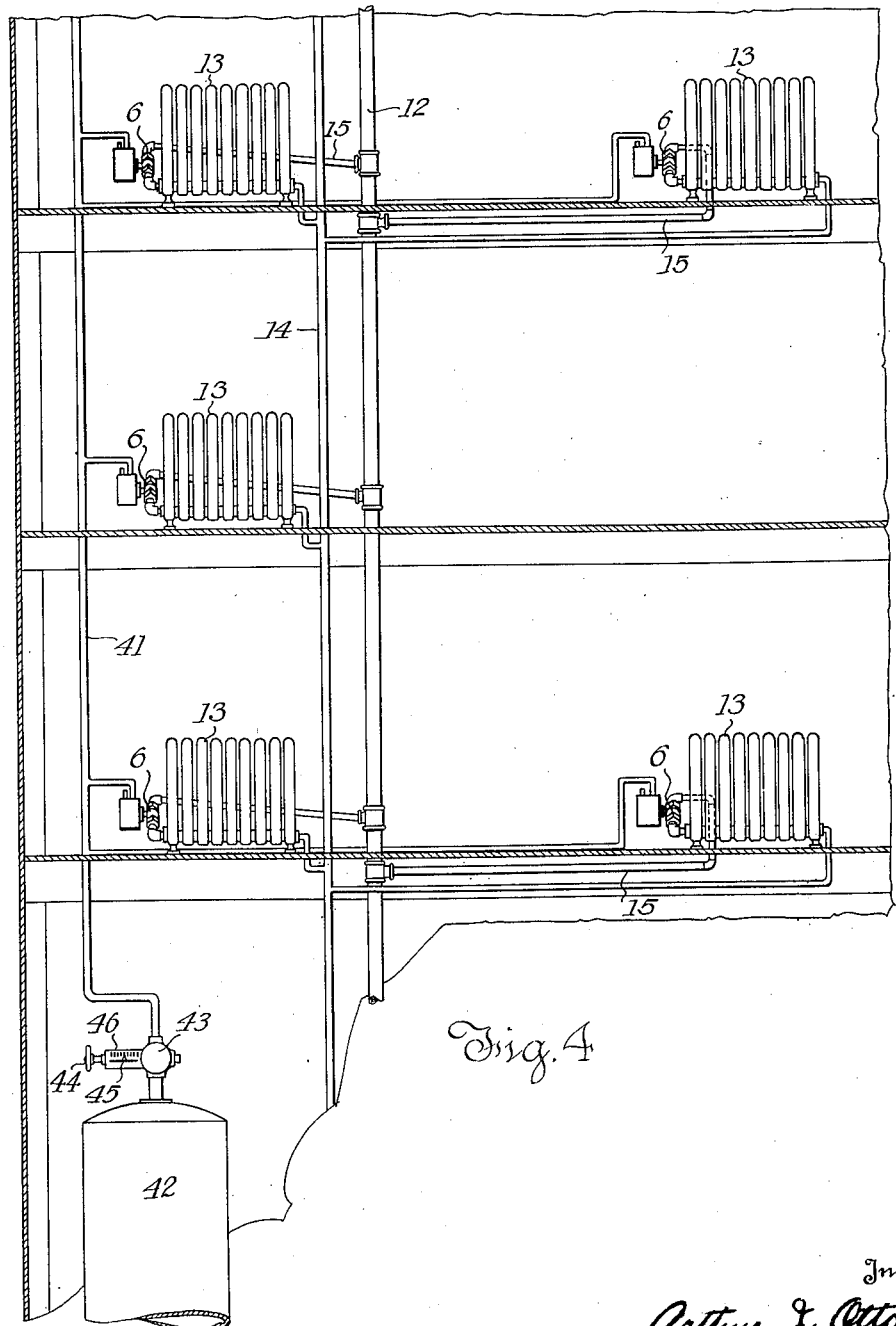
Fig. 4 is a diagram of the system showing it applied to five radiators.

Referring first to Fig. 1, 6 represents the body of a steam valve which controls the admission of steam to a radiator and which in the present description is shown as typical of any heat controlling means, many of which are known in the art, and practically any of which may be operated by the thermostat hereinafter described.

The body 6 has a seat 7 with which coacts a steam valve 8. 9 is the steam inlet passage and 10 is the steam outlet passage. The valve 8 is urged in an opening direction by the spring 11.

Referring now to Fig. 4, each of the valves just described controls the flow of steam from a manifold or riser 12 to a radiator 13 of ordinary construction, from which the condensate is drained to a return main 14. The valve body 6 is supported on a branch pipe 15 leading from the riser 12 and itself supports the thermostatic mechanism by means of a combined plug and flange 16 threaded into the upper end of the body 6 and having a guide passage for the stem 17 of the valve 8.

Leakage along the steam 17 is precluded by a flexible metallic bellows 18 closed at one end and connected at the other end to the member 16. This produces what is in effect a packless valve. Riveted to the flange portion of the member 16 is a heat insulating plate 19 which is seated in an annular internal groove of a cylindrical casing 21 which, as explained in the patent to Roys may be constructed in two parts, but the exact construction of which is immaterial to the present invention.

The purpose of the insulating plate 19 is to reduce the transfer of heat from the steam pipe to the thermostat so that the thermostat will respond to atmospheric temperature unaffected by heat conducted from the steam pipe.

The end of the casing 21 remote from the valve body 6 is formed with a spiral slot 22 subtending an angle of about 90°, and at the side opposite this slot is provided with an arcuate channel 23. A disk-like rotatable spider 24 is guided at one side in the channel 23 and has at the other side a projecting lug 25 which extends through the slot 22 and is guided thereby. The member 25 serves as a handle to rotate the spider 24 and in such rotary motion the spiral slot 22 causes the spider 24 to be canted slightly toward and from the valve body 6.

Threaded at the center of the spider 24 is a stud 26 having an enlarged head 27 to which is attached a thermostatic element consisting of lenticular hollow cells 28, two being shown, though any desired number might be used. These cells are of known construction, are made of flexible metal and contain sealed within them, a highly expansible medium, usually a gas which upon moderate rise of temperature expands sufficiently to exert considerable internal pressure in the cells 28 so as to cause these cells to expand.

The initial adjustment of the instrument may be made by turning the stud 26 and after this adjustment has been made it is maintained by turning up the check nut 29.

Seated against the right hand end of the thermostatic unit, is a follower made up of a plate 31 of material having a low coefficient of heat conduction spaced from a metal plate 32 by means of filler pieces 33 also of low thermal conductivity. Bolts 34 passing through the plates 31 and 32 and the spacers 33 hold the follower in assembled relation.

The cells 28 are in effect a thermostatic motor, that is, they derive from changes in temperature sufficient energy to move the valve 8, and in the structure of the Roys patent they directly actuate this valve.

According to the present invention, however, what is designated as a secondary motor is interposed in the connections between the thermostat and valve (though it might be otherwise located), and is used to modify the effect of the thermostatic motor 28 on the valve 8. This secondary motor consists of a lenticular expansible cell 35 which is supported on the center of the plate 32 and to which pressure fluid preferably compressed air may be conducted by a flexible pipe 36. The cell 35 is confined between a plate 37 also supported on the center of the plate 32, and a companion plate 38 hinged to the plate 37 at 39. The plate 38 bears directly on the closed end of the bellows 18 which bellows are in thrust relation with the stem 17. It is obvious therefore that the expansion of thermostatic cells 28 or the expansion of the secondary motor cells 35, either or both, will have the effect of moving the valve 8 in a closing direction. Their contraction has the reverse effect of permitting the valve to open under the urge of spring 11.

All the pipes 36 in a system (and it will be understood that ordinarily there will be one of the mechanisms above described for each radiator in the system) are connected to a pressure main or control main 41. This is fed from a pressure tank 42 by a pressure regulating valve 43 of known type. The valve 43 acts as an admission and exhaust valve and may be set by turning the hand wheel 44 to establish and maintain any desired pressure in the pipe 41 from atmospheric pressure to the maximum needed to energize the secondary motors. Any valve which will function to establish pressures throughout the desired range in the pipes 41 might be used, but it is important that such valve be capable of both increasing and reducing this pressure. The pressure for which the valve is set is indicated by a pointer 45 which reads against a scale 46 so that the operator shall know what pressure is established in the main 41 and consequently in the connected secondary motor cells 35.

The maximum separation of the members 37 and 38 is fixed by an adjustable stop which takes the form of a collar 48 on a pin 49 threaded into a boss 51 on the member 37. By screwing the stem 49 into the boss 51 more or less it is possible to vary the maximum separation of the parts 37 and 38.

This adjustment is indicated by a pointer 52. The inward or collapsing motion of the parts 37 and 38 toward each other is limited by the collision of the part 38 with the boss 51, as is clearly indicated in Fig. 2. A screw stop 53 which extends through a hole in the member 38 may be screwed into a tapped hole 54 formed in the member 37 to receive it, and at such time functions to hold the members 37 and 38 clamped together, as indicated in Fig. 3. This is a permanent lock-out used only when it is desired to render the secondary motor 35 inoperative at all times.

To permit the occupant of a particular room to render the motor inoperative temporarily there is hinged at 55 on the upper end of the member 37 a weighted arm 56 which has a pin 57 engaging an arcuate extension 58 on the upper end of the member 38. If the secondary motor 35 be under pressure, and therefore distended, as shown in Fig. 1, it is possible to overpower the motor 35 by drawing the lever 56 upward to its limit of motion, as shown in Fig. 2. The effect is to draw the members 37, 38 together as indicated in Fig. 2, and since the motor 35 is under pressure the frictional resistance of the arcuate extension 58 with the pin 57 is sufficient to retain the lever 56 in the upward position of Fig. 2. It will remain in such position until the motor 35 is deflated at which time the frictional resistance ceases and the lever 56 drops of its own weight.

With the parts arranged as above described, the thermostat is initially adjusted by turning the stud 26 and the adjustment so made is maintained by the lock nut 29. Thereafter the occupant of the room may adjust the thermostat to maintain any desired day temperature, within reasonable limits, by moving the extension 25 in the slot 22. During the day the engineer sets the valve 43 so that atmospheric pressure is established in the air main 41. All the secondary motor cells 35 therefore collapse and the thermostatic cells 28 act directly on the valve 8 to maintain the temperature determined by the adjustment of the member 25. At night the engineer can cause the thermostats to maintain a lower temperature by manipulating the valve 43 to establish pressure in the line 41. The higher this pressure the more the night temperature will be depressed below the day temperature normally maintained by the thermostatic cells 28. If the pressure in the line 41 be high enough the valve 8 will be held closed at all times and there will be no regulation of temperature, but the normal operation of the device is merely to depress the night temperature below the day temperature an amount determined by the pressure maintained in the line 41.

Certain rooms should be heated at day temperature at all times, and in such rooms the screw 53 is set up, as shown in Fig. 3, to render the secondary motor 35 inoperative in that room. A person desiring temporarily day temperature adjacent a given radiator, while the system is set for night temperature, may secure this result by drawing the lever 56 upward to the position shown in Fig. 2, which has the effect of rendering the secondary motor 35 inoperative. This effect is only temporary for when the pressure in the main 41 is reduced to atmospheric the lever 56 drops by its own weight and renders the secondary motor 35 again operative.

It will be observed that the mechanism above described extends dual regulation to direct connected thermostats, and that it has the effect not only of permitting a single thermostatic element to regulate at characteristically different day and night temperatures, but it also puts it within the control of an operator at a central point to determine how much the temperature at night or during periods of disuse shall be below the temperature automatically maintained during the day in other periods of use. This is a useful characteristic, because it permits the operator to meet particular conditions such as those dependent on outside temperature, the probable period of disuse of the building and the like.

While I prefer to interpose the secondary motor 35 in the operative connections between the thermostat and the heat controller it might be otherwise arranged, the only essential, so far as the broad aspects of the invention are concerned, being that it be so positioned as to exert a modifying effect on the controlling action of the thermostat.

In certain cases also, certain of the adjusting features might be omitted, as might either or both of the hold-out mechanisms for the secondary motor 35. It is not essential that the heat controller be a steam valve, as various other heat controllers are known and are capable of substitution without the exercise of invention. Direct connected thermostatic valves, other than that described in the patent to Roys, are known, and the Roys structure is here chosen only for purposes of illustration, the invention being readily applicable to various thermostats of this general type.

The term "pneumatic" is used in the claims in a generic sense to cover any expansible fluid medium.

What is claimed is:—

1. The combination of a thermally responsive motor; a heat controller operatively connected therewith to be actuated thereby in response to changes in temperature; adjusting means interposed in said connections for varying the relation between said motor and controller; a pneumatic motor for progressively moving said adjusting means in response to pressure changes in said pneumatic motor; and means operable from a remote point for varying the pressure in said pneumatic motor.

2. The combination of a thermally responsive motor; a heat controller operatively connected therewith to be actuated thereby in response to changes in temperature; adjusting means interposed in said connections for varying the relation between said motor and controller; a pneumatic motor for progressively moving said adjusting means in response to pressure changes in said pneumatic motor; means operable from a remote point for varying the pressure in said pneumatic motor; and manually operable means adjacent said thermally responsive motor for locking said pneumatic motor in collapsed condition while the latter is subject to pressure.

3. The combination of a thermally responsive motor; a heat controller operatively connected therewith to be actuated thereby in response to changes in temperature; a pneumatic secondary motor connected to exert force upon said controller in conjunction with the thermally responsive motor whereby the regulative effect of the latter is changed in response to changes of pressure in the secondary motor; means for varying the pressure in the secondary motor; and manually adjustable means for locking said secondary motor in the position it assumes when deenergized.

4. The combination of a thermally responsive motor; a heat controller mechanically connected directly therewith to be actuated thereby in response to changes in temperature; a secondary motor interposed in said mechanical connections and reacting between said thermally responsive motor and controller to modify the effect of the former on the latter according to the degree of energization of the secondary motor; and manually controlled means for variably energizing the secondary motor.

5. The combination of a thermally responsive motor; a heat controller mechanically connected directly therewith to be actuated thereby in response to changes in temperature; a secondary motor of the pneumatic type interposed in said mechanical connections, and reacting variably between said thermally responsive motor and controller to modify the effect of the former on the latter according to the degree of pressure in the secondary motor; and manually controlled means for varying the pressure in said secondary motor.

6. The combination of a thermostat, comprising an expansible cell structure containing a pressure generating fluid responsive to temperature changes; a heat controller operatively connected therewith to be actuated thereby a pneumatic motor interposed in said operative connections and reacting between said thermostat and controller to modify the effect of the former on the latter variably, according to the degree of pressure in the pneumatic motor; and manually controlled means for varying the pressure in said pneumatic motor.

7. The combination of a thermostat, comprising an expansible cell structure containing a pressure generating fluid responsive to temperature changes; a heat controller operatively connected therewith to be actuated thereby; a pneumatic motor interposed in said operative connections and reacting variably between said thermostat and controller to modify the effect of the former on the latter, according to the degree of pressure in the pneumatic motor; means for varying the pressure in said pneumatic motor; and means for locking said pneumatic motor in collapsed condition.

8. The combination of a thermally responsive motor; a heat controller operatively connected therewith to be actuated thereby in response to changes in temperature; adjusting means interposed in said connections for varying the relation between said motor and controller; a pneumatic motor for progressively moving said adjusting means in response to pressure changes in said pneumatic motor; means operable from a remote point for varying the pressure in said pneumatic motor; manually operable means adjacent said thermally responsive motor for locking said pneumatic motor in collapsed condition while the latter is subject to pressure; means tending to release the last named means; and means rendered active by pressure in said pneumatic motor for maintaining said locking action.

9. The combination of a thermally responsive motor; a heat controller operatively connected therewith to be actuated thereby in response to changes in temperature; a secondary motor connected to exert force upon said controller in conjunction with the thermally responsive motor whereby the regulative effect of the latter is changer in response to changes in energization of the secondary motor; means for variably energizing the secondary motor; manually adjustable means for locking said secondary motor in the position it assumes when deenergized; means tending to release the last named means; and means rendered active by energization of said secondary motor for maintaining said locking action.

10. The combination of a thermostat, comprising an expansible cell structure containing a pressure generating fluid responsive to temperature changes; a heat controller operatively connected therewith to be actuated thereby; a pneumatic motor interposed in said operative connections and reacting variably between said thermostat and controller to modify the effect of the former on the latter, according to the degree of pressure in the pneumatic motor; means for varying the pressure in said pneumatic motor; means for locking said pneumatic motor in collapsed condition; means tending to release the last named means; and means rendered active by pressure in said pneumatic motor for maintaining said locking action.

In testimony whereof I have signed my name to this specification.

ARTHUR J. OTTO.